(12) United States Patent
Krueger

(10) Patent No.: US 8,756,252 B2
(45) Date of Patent: Jun. 17, 2014

(54) CATEGORY-BASED NAME SCHEMES IN PARSING FRAMEWORKS

(75) Inventor: Uwe Krueger, Karlsruhe (DE)

(73) Assignee: SAP AG, Walldorf (DE)

( * ) Notice: Subject to any disclaimer, the term of this patent is extended or adjusted under 35 U.S.C. 154(b) by 1138 days.

(21) Appl. No.: 12/327,188

(22) Filed: Dec. 3, 2008

(65) Prior Publication Data

US 2010/0138448 A1 Jun. 3, 2010

(51) Int. Cl.
*G06F 17/30* (2006.01)

(52) U.S. Cl.
USPC .................................. 707/798; 707/E17.127

(58) Field of Classification Search
CPC ................... G06F 17/30286; G06F 17/30607; G06F 17/30864; G06F 11/3688; G06F 17/30705; G06F 17/30731; G06F 19/18; G06F 19/26; G06F 2009/45562; G06F 8/24; G06F 8/71; G06F 9/45558
See application file for complete search history.

(56) References Cited

U.S. PATENT DOCUMENTS

| 7,017,162 B2 * | 3/2006 | Smith et al. | 719/328 |
| 7,529,811 B2 * | 5/2009 | Thompson | 709/219 |
| 2003/0069908 A1 * | 4/2003 | Anthony et al. | 707/513 |
| 2008/0082959 A1 * | 4/2008 | Fowler | 717/104 |

* cited by examiner

*Primary Examiner* — Shyue Jiunn Hwa
(74) *Attorney, Agent, or Firm* — Buckley, Maschoff & Talwalkar LLC

(57) ABSTRACT

According to some embodiments, categories and an associated category graph may be determined for a parsing framework. Moreover, a type for the parsing framework may be defined, wherein at least one category is automatically created and inserted into the category graph for an implementation element of the defined type. Namespaces may be automatically defined for the categories based at least in part on inheritance relationships associated with the categories in the category graph.

15 Claims, 6 Drawing Sheets

| CATEGORY 502 | NAME 504 | IMPLEMENTATION 506 |
|---|---|---|
| I0 | T0 | TYPE0 |
| IA | T2 | TYPE2 |
| IB | T2 | TYPE2 |
| IC | T1 | TYPE1 |
| ID | T3 | TYPE3 |
| | T2 | TYPE2 |
| | T2 | TYPE2 |
| | T3 | TYPE3 |
| IH_ACD | T2 | TYPE2 |

FIG. 5

CATEGORY-BASED NAME SCHEMES IN PARSING FRAMEWORKS

FIELD

Some embodiments of the present invention may relate to name schemes in a parsing framework. In particular, some embodiments may comprise systems and methods that provide category-based name schemes in a parsing framework and/or that combine parameter and argument specification in text-based parsing frameworks.

BACKGROUND

Some tools use text-based descriptions to configure dedicated tool execution behaviors, including descriptions associated with command interpreters and/or tools that use an abstract description of work to be done in connection with scheduled execution tasks. By way of example, a text-based description may be provided to describe a build process (and associated dependencies) to automate a software build procedure. Moreover, such descriptions may include a naming scheme and/or multiple levels of elements (including, for example, elements that are nested within each other).

In some cases, a manual approach may be used to derive parsing for multiple levels of elements (e.g., parsing associated with a parameter name and/or an argument type associated with an element). Note, however, that a manual approach in this environment may be inefficient. Moreover, the implementation may need to be sharable (e.g., existing implementations being adopted to newly created interfaces to achieve a desired result). Moreover, an initial implementation may need to be modifiable in a development context to be extended to support new arising interfaces.

Approaches that improve name schemes in a parsing framework could, therefore, be desirable. Moreover, it may advantageous to provide one or more systems and/or methods to do so in an efficient and convenient manner.

BRIEF DESCRIPTION OF THE DRAWINGS

FIG. 5 is a tabular view of a namespace database in accordance with some embodiments of the present invention.

DETAILED DESCRIPTION

Figure 1:
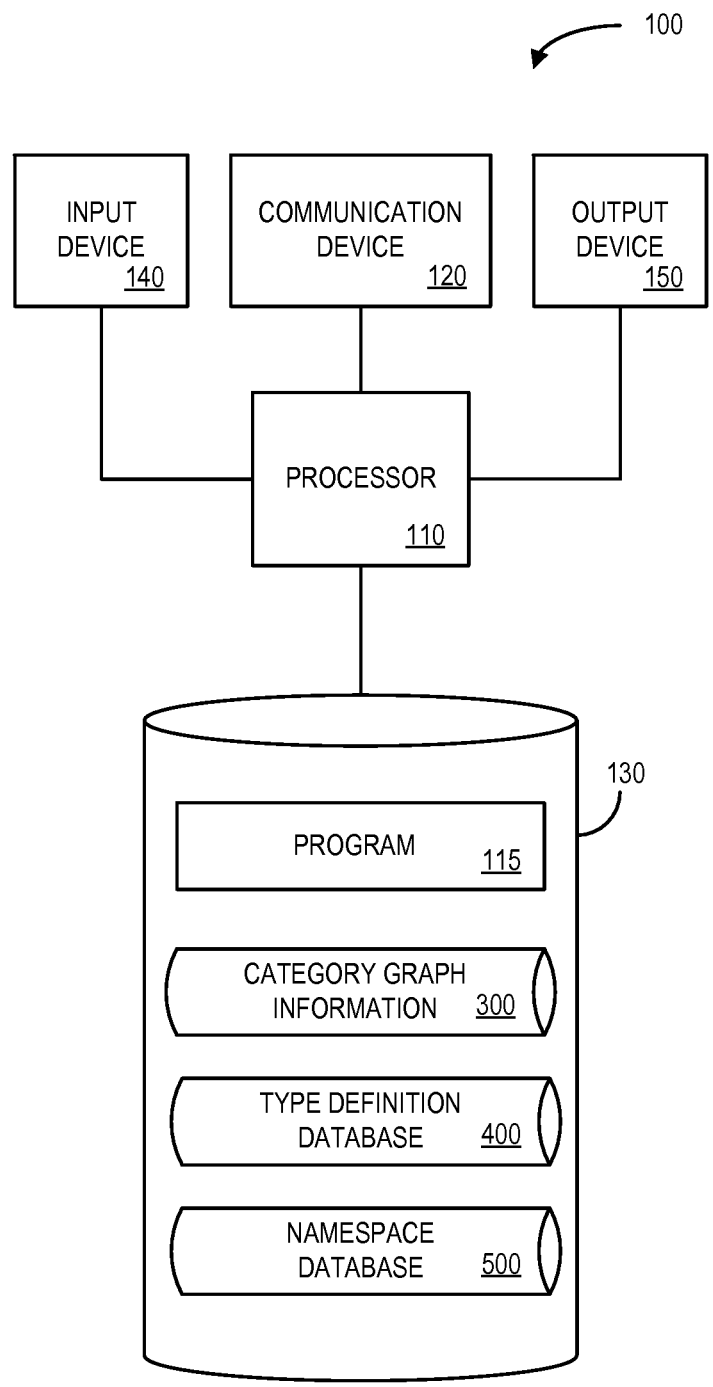
FIG. 1 is block diagram of a system according to some embodiments of the present invention.

Consider, for example, the Ant build tool which is implemented using the Java programming language. The Ant build tool may facilitate an automated software build process by using the Extensible Markup Language ("XML") protocol to describe the build process and its dependencies. In particular, Ant uses an XML-based description file to describe the build steps that must be executed along with their interdependencies (e.g., it provides a description language to describe the execution sequence of actions).

The actions and arguments for those actions are described in XML, and the Ant tool parses the XML file to determine an execution order of necessary steps to complete a software build as appropriate. Moreover, several methods are provided within the framework to extend pre-defined execution elements (including actions and data types used as arguments for those actions). In the example of the Ant tool, two basic kinds of elements may be provided: "tasks" and "types."

A "task" element may describe an execution step that can be used to define statement sequences that will be executed under dedicated circumstances to achieve a dedicated goal. A "type" element may a declare data structure that can be used as an argument for tasks (or for other types).

Note that extensibility may be permitted such that new tasks and types described by java classes can be added as appropriate. For example, it may be possible to add new tasks by providing a dedicated java class for the task and assigning it to a unique name in the context of a description file (and the name may be unique in a dedicated namespace for tasks). Also note that Ant is associated with different flavors of such types (e.g., regular data types or conditions) having similar basic behaviors. For each kind, there is a separate namespace created during the execution of the description file. Moreover, it may be possible to declare new types by providing a dedicated class and assigning it to a name in this namespace. The different namespaces may be used, for example, to allow the same names in different contexts (although the number of contexts may be pre-determined).

Consider now a "type" extension mechanism. In contrast to tasks, instances of new types must be usable inside a task attribution (arguments to tasks) wherever the described data should be used regardless of the type of task. Thus, the implementation of the task may not know about all possible types. Moreover, it should be possible to allow the description of different implementations for a dedicated parameter according to its specified base type.

In java, for example, this may be handled via inheritance. The method to be called may describe an expected type, but the caller may pass any derived type (with potentially different implementations). This may be achieved in java by the separation of the interface of a type and its concrete implementation. That is, the task may describe the interface required by a java base class or interface and the parsing framework may provide an appropriate instance at runtime.

In the description, such a task argument description may be handled by nested elements:

```
<mytask myattr="a">
    <myargument anotherattr="b">
    ...
    </myargument>
</mytask>
``` where all elements are represented by instances of java classes. The parsing framework may be based on reflection at the java level, and may use an approach related to java beans. Note that the name of an element of an XML description (or "tag") may be used to assign an instance of a java class to this element. The object may then be used to control the parsing of the element attributes (and nested elements) by examining the methods of the object. Such an approach may allow attributes or nested elements to be determined by examining the method set of the class of the object assigned to an outer XML tag. Attributes may be valid if the object provides an appropriate setter method (java bean). For nested elements, a creation method may be used to extract the name for the nested element. For example, the method "Type t createSubElement( )" may parse a nested element called "SubElement." The returned object may then be used to control the parsing of the nested element. Although such an approach may give a java bean full control over the parsing of the description, it disallows polymorphism (e.g., because the implementation of the bean controlling the parsing of nested elements is fully determined by the surrounding bean).

To avoid such a result, note that Ant distinguishes between general nested elements that can freely be defined by beans and so called types. Each type supports the assignment of an explicit identifier and the definition of an instance outside of task sequences (e.g., a way similar to global variables in a conventional programming language). Such an identifier may be used as kind of variable name:

```
<typedef name="mytype" class="..."/>
<mytype id="mytypeid" ...>
    ...
</mytype>
``` where the typedef statement allows definition of a new name for a new data type and the assignment of an implementation class for this name. This name may then be used to define instances (e.g., the tag name may be mapped to the implementation class, which is used to create an instance). This instance may then be used to parse the attributes and nested elements to setup the instance, as previously described.

Additionally, note that each type may support an indirection. When specifying an instance of the type it is possible to specify only a reference to an already existing instance using its identifier (instead of describing all the attributes and nested elements locally). A data type may be prepared to forward its Application Programming Interface ("API") to a foreign object retrievable by the specified identifier. Note that such an approach may only work if the implementation class of the effective foreign object is identical to (or derived from) the implementation class of the specified data type.

This approach may now be used to support polymorphism. For example, if the type returned by the creation method supports such indirection, any globally defined type can be assigned by reference as long it uses this type as base class:

```
<myelement ...>
    <mynested ref="mytypeid"/>
    ...
</myeleemnt>
```

Here the class assigned class for myelement provides the method:

```
public NestedType createMyNested( )
{...}
``` and the class is prepared to handled references as previously described.

Such use of the standard behavior of dedicated type objects to achieve polymorphism, however, has disadvantages. For example, the approach may only work with the previous definition of global instances of a type. Moreover, it may not be possible to define the desired data fully as a nested element at the location where it is used, if the data type implementation class of the effective data type is different from the one used to describe the parameter.

As another approach, a special kind of setter might be used instead of a creation method. In Ant, these may be associated with methods starting with the term "add." As with creation methods, the name of the nested element may be extracted from the method name, but in this case the object is not created by the method. Instead, the "type" of the parameter is used to determine the implementation class and the instance is provided by the framework.

Note that with respect to polymorphism, there may be little or no difference with the use of a special kind of setter as compared to the creation method. That is, both approaches might only allow control of the initialization of the nested element. Note also that this may now be done prior to the hand-over to the surrounding bean (although in the Ant tool this may not be the standard case, and may require a special setter starting with "addConfigured").

Thus, the name of the nested element would be used for two purposes: (i) the name of the parameter, and (ii) the name mapped to an implementation class. As a result, instead of specifying the name of the nested element at the method level, the name might be taken from global type definitions. That is, the local method may only specify the base type (java type) that is required by the implementation. The implementation class may then be determined by the framework using the global name assignments to implementation classes to map a name of a nested element to a bean (and the type may only be used to validate the implementation type). In this case, it may need to be assignment compatible with the specified argument type:

```
<typedef name="mytype" class=."..."/>
<myelement ...>
    <mytype ...">
        ...
    </mytype>
    ...
</myelement>
```

In the Ant tool, the add and addConfigured methods without a name suffix may be used for this. Such an approach provide for polymorphism, because the concrete implementation is specified as part of the nested element. Note, however, that the surrounding bean has now lost the control of the naming of the nested elements, and therefore is not able to distinguish between different purposes or intended parameters for which a nested element may be used.

Note that any of these approaches may have significant disadvantages. For example, there may be a trade-off between allowing polymorphism and separating purposes for nested elements. Moreover, there may be globally unique names for types that can be used in a polymorphic manner. The unfortunate result may be, for example, that separate global namespaces are introduced for dedicated kinds of elements. Note, however, in one such area the same name might appropriate in different contexts for different things.

Consider, for example, a designer who wants to provide a general mechanism to describe properties. The designer might start with a property type:

```
class Property {
    public setName(String name) {...}
    public setValue{String name) {...}
    public String getName( ) {...}
    public getValue( ) {...}
}
```

Where this class is used to declare a first default type with the name "property.". Additional variations might then be defined by inheriting from this class. Now, wherever required an element may request a property setting and here the nested property element can be used.

Later the designer discovers that he or she additionally needs a property pattern that can be used to match property values. Therefore, the designer also defines a base type:

```
class PropertyTemplate {
    public setName(String name) {...}
    public boolean match{String value) {...}
    public String getName( ) {...}
}
```

The simplest version of specifying a property template might be to just specify the value. Therefore, the designer might create the bean:

```
class SimplePropertyTemplate extends PropertyTemplate {
    public setName(String name) {...}
    public boolean match{String value) {...}
    public setValue{String name) {...}
    public String getName( ) {...}
    public getValue( ) {...}
}
```

The designer may then want to select a type name for this, only to discover that the most useful name ("property") is already taken by the mapping to the class Property. So the designer instead has to choose a less useful name, such as "simplepropertytemplate." In both cases a data type is expected, so the coarse grained fixed namespaces provided by Any may not be used. But in parsing contexts requiring a Property, the name property should be mapped to a Property instance, and when a PropertyTemplate is requested, a mapping to a SimplePropertyTemplate would be useful.

As still another approach, interfaces might be used instead, in which case the designer might change the implementation of the initial Property class to also implement this interface. Even this approach, however, has significant disadvantages. Note, for example, that the implementation must be sharable (e.g., existing implementations being adopted to newly created interfaces to achieve a desired result). Moreover, an initial implementation may need to be modifiable in a development context to be extended to support new arising interfaces.

As a consequence, in modular environments it may be advantageous to choose the names for dedicated evaluation contexts described by the surrounding bean. This may be helpful because the surrounding bean describes the meaning for nested elements (and therefore for the interpretation of the names of XML tags).

To alleviate problems inherent in the prior art, some embodiments of the present invention introduce systems, methods, computer program code, and means to improve name schemes in a parsing framework. Note that many text-based descriptions used to configure behavior of dedicated tool execution (e.g., to automate a software build process) are associated with a single namespace. Moreover, the manual definition of explicit, separate namespaces for different pre-defined contexts may be impractical. Note that an evaluated context may be specified, for example, as base type extracted from the method parameter. The problem may be how to map this base type to a dedicated context out of an extensible set of contexts.

According to some embodiments, such contexts may be associated with distinguished base types. Those contexts may, for example, describe categories forming a net of super-categories and sub-categories analogous to the assignment compatibility among the associated base types. Each category may build a namespace that inherits the namespaces of its sub-categories, and a namespace may include all mappings of the namespaces of all appropriate sub-categories.

When defining a new type by assigning an implementation to a name, this implementation class may be assigned to all categories for which it is applicable. A category may be applicable, for example, if the implementation class is assignment compatible with the associated base type. Moreover, all those categories may get an entry for the assigned name. The type implementation will be available in all those categories with the same name, but the name may remain free with respect to other categories.

Thus, the relationships among categories (and therefore namespaces) may be automatically manageable according to the inheritance relationships of the associated classes. In addition, categories may be defined like types by an assigned class or interface.

Note that such a model may be independent of java or java classes. In general, there may be interface and implementation elements that provide a relation AssignmentCompatible that is used to calculate the sub-category relation, and each declared category may be associated with such an element. For example, a category C1 may be a sub-category of C2 if and only if the associated element of C1 is assignment compatible with the associated element of C2.

Consider, by way of example only, FIG. 1 which illustrates a block diagram of a system 100 in accordance with some embodiments of the present invention. The system 100 might, for example, comprise a platform or engine that includes a processor 110, such as one or more INTEL® Pentium® processors, coupled to a communication device 120 configured to communicate via a communication network (not shown in FIG. 1). The communication device 120 may be used to exchange information, for example, with one or more remote devices. Note that elements described herein as communicating with one another may be directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between devices and/or systems may proceed over any one or more transmission protocols that are or become known, such as Asynchronous Transfer Mode (ATM), Internet Protocol (IP), Hypertext Transfer Protocol (HTTP), and/or Wireless Application Protocol (WAP).

The processor 110 is also in communication with an input device 140. The input device 140 may comprise, for example, a keyboard, a mouse, or computer media reader. Such an input device 140 may be used, for example, to enter information about an automated software build process. The processor 110 is also in communication with an output device 150. The output device 150 may comprise, for example, a display screen or printer. Such an output device 150 may be used, for example, to provide reports and/or display information associated with an automated software build process.

The processor 110 is also in communication with a storage device 130. The storage device 130 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 130 stores a program 115 for controlling the processor 110. The processor 110 performs instructions of the program 115, and thereby operates in accordance any embodiments of the present invention described herein. For example, the processor 110 may arrange for categories and an associated category graph may be determined for a parsing framework. Moreover, a type for the parsing framework may be defined, wherein at least one category is automatically created and inserted into the category graph for an implementation element of the defined type. Namespaces may be "automatically" defined by the processor 110 for the categories based at least in part on inheritance relationships associated with the categories in the category graph. As used herein the term "automated" indicates that at least some part of a step associated with a process or service is performed with little or no human intervention.

As used herein, information may be "received" by or "transmitted" to, for example: (i) the system 100 from other devices; or (ii) a software application or module within the system 100 from another software application, module, or any other source.

Figure 2:
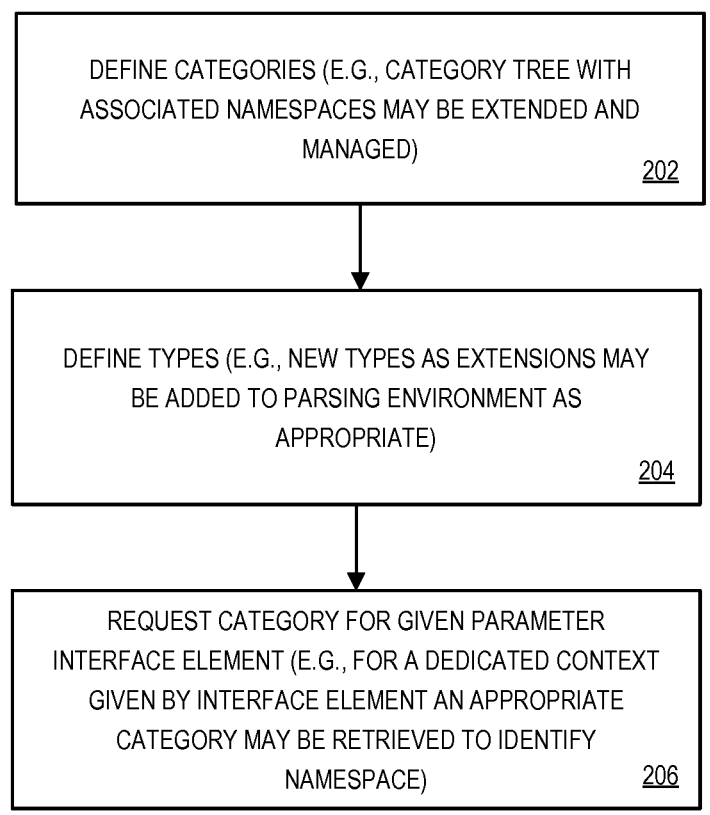
FIG. 2 illustrates a method according to some embodiments of the present invention.

FIG. 2 is a flow diagram of a method pursuant to some embodiments. The method might be associated with, for example, the system 100 of FIG. 1 pursuant to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 202, categories may be defined with respect to a parsing framework. For example, a category graph (or tree) with associated namespaces may be extended and managed as appropriate. Note that such a category graph may be associated with a generic category "root" or super-category of all categories. The root category may, by definition, have an empty namespace (e.g., all added name mappings may be ignored). Moreover, when a new category is created, it may be inserted into the category graph as direct child of all categories in the graph that (i) are a super-category and (ii) do not have a child that is a super category of the new category. Moreover, all siblings of the newly inserted category, that are sub-categories of the newly inserted category, may be moved to be direct children of the newly inserted category.

According to some embodiments, each category may have an assigned namespace, and the namespace of a category may always contain all entries of all direct sub-categories (except the for the root category). Moreover, according to some embodiments, the mapping provided by the namespace may be unique. That is, there may not be two direct sub-categories of a category whose namespaces contain different mappings for the same name.

At 204, types may be defined in connection with the parsing framework. For example, new types may be added to the parsing environment as extensions. According to some embodiments, a type definition may be provided such that a category is created for the implementation element of a type declaration. This category may then be inserted into the category graph as appropriate (if not already present). Also note that a type declaration may be valid if the assigned name is not yet valid for all categories for which the implementation element is applicable. Note that, as a result, the categories might not be explicitly defined, but instead build up automatically according to the defined types.

At 206, a category may be requested for a given parameter interface element. For example, for a dedicated context given by the interface element of a parameter, the appropriate category may retrieved to identify the namespace to map a name given by the XML tag to an implementation. The parsing framework may then use the specification of interface or implementation elements with the required formal parameter. The category of this element may be inserted into the category tree (if not already) present yet. Note that each parameter type may therefore implicitly set up a separate category. The namespace of this category may be used to identify nested elements as arguments (and to map them to implementations). Further note that information might not be explicitly defined, but instead build up automatically (e.g., a category graph may be built up by parameter types used for parsing).

Note that an extensible parsing framework that allows adding and/or identification of abstract types will typically use pre-defined namespaces to de-couple a consumer of abstract types and a provider of concrete types. As a consequence, names for concrete types share a common namespace and thus cannot be selected freely depending on usage contexts. According to some embodiments described herein, an extensible parsing framework is provided that allows adding and/or identification of abstract types by automatically configured category-based namespaces. The categorization may be performed, for example, using java reflection. Such categorization may allow a de-coupling of consumers and providers of concrete types without the need for pre-defined global namespaces.

Such an embodiment may let the same implementation meet several categories and be available with the same name in all applicable contexts. Moreover, disjoint contexts may be represented by categories that feature automatically separate namespaces. In addition, there might be aggregative categories that join different super-categories (note that this may effectively lead to a joint namespace for the concerned super categories). Furthermore, according to some embodiments, the type compatibility for the parsing may be determined automatically from the assignment compatibility of the interface and implementation elements.

Figure 3:
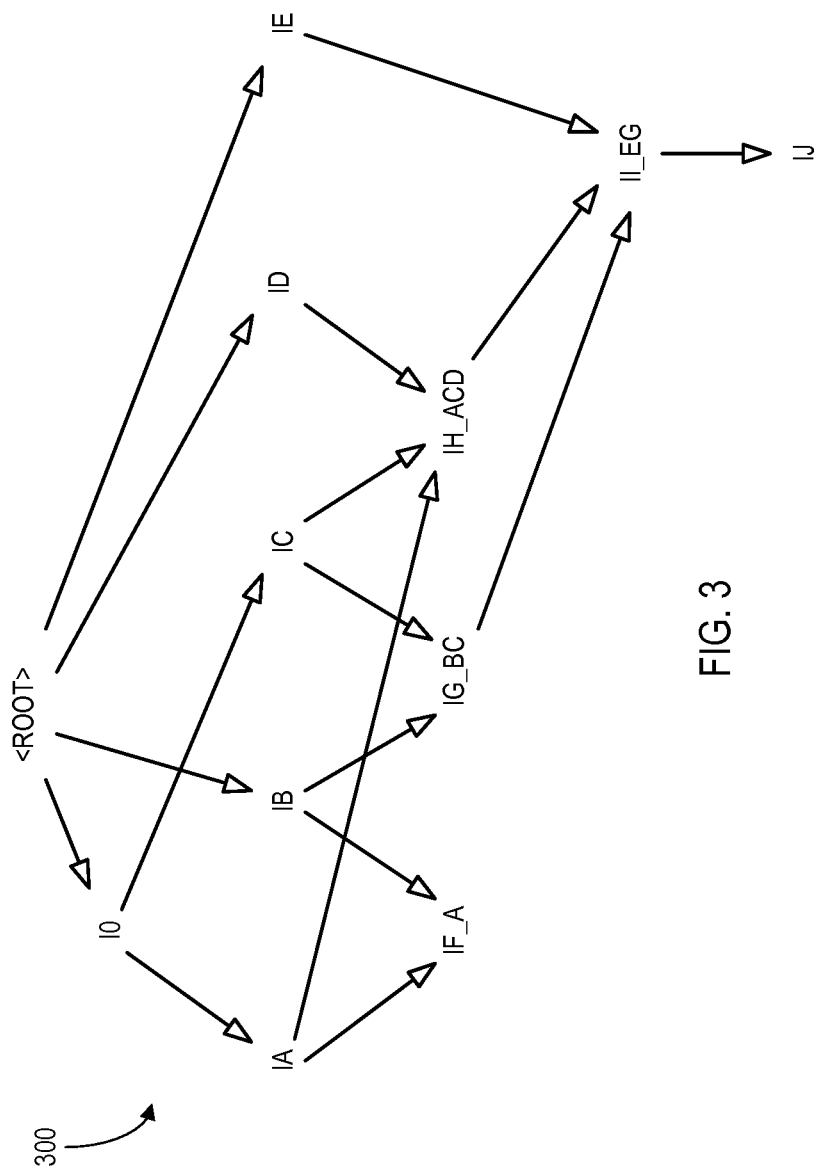
FIG. 3 is a category graph illustrating associated interface inheritances in accordance with some embodiments of the invention.

Consider, by way of example, an application using java class based categories that are described by java interfaces featuring multiple inheritance or simple base classes to build a category graph. Note that a dedicated-type implementation may include a java class with multiple category interfaces (or extend a single base class of a category) for which it is applicable. Consider, for example, FIG. 3 which is a category graph 300 illustrating associated interface inheritances in accordance with some embodiments of the invention. The graph includes a <root> element with various interfaces defined in a class hierarchy. For example, node "IB" of the graph 300 is associated with nodes "IF_A" and "IG_BC" as illustrated tin FIG. 3.

With respect to interfaces intentionally used as categories, there may be an explicit statement to define categories (as is the case in connection with types and tasks for the Ant tool). Such an approach may increase the understandability of the implementation, but may not be required because the systems may configure itself automatically according to the used parameter types. The explicit definition of categories also have an advantage in that potential name clashes might be detected when new types and categories are initially defined (and later when a parameter type is first used).

In addition to the category graph information 300, the storage device 130 of the system 100 illustrated in FIG. 1 may further store a type definition database 400. One example of such a database 400 that may be used in connection with the system 100 will now be described in detail with respect to FIG. 4. The illustration and accompanying descriptions of the databases presented herein are exemplary, and any number of other database arrangements could be employed besides those suggested by the figures.

Figure 4:
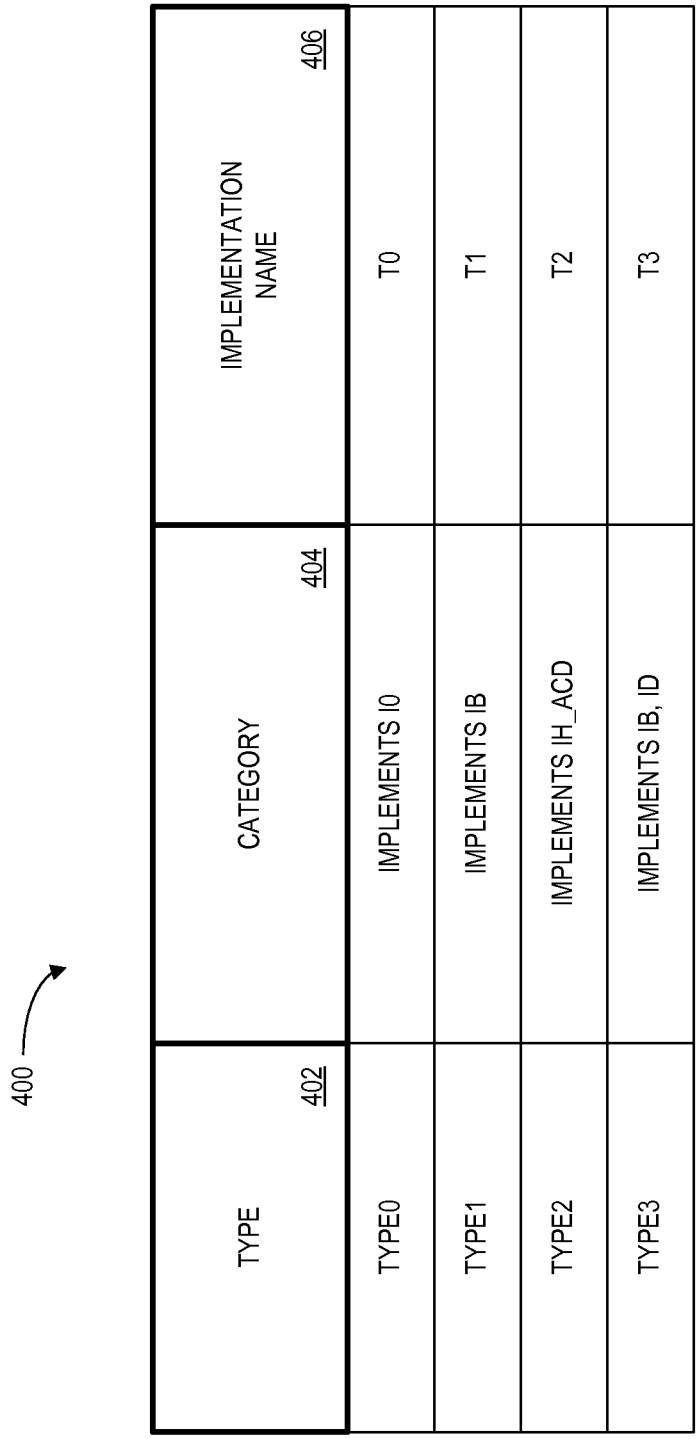
FIG. 4 is a tabular view of a type definition database in accordance with some embodiments of the present invention.

FIG. 4 is a tabular view of a portion of a type definition database 400 in accordance with some embodiments of the present invention. The table includes entries associated with element types of a parsing framework. The table also defines fields 402, 404, 406 for each of the entries. The fields specify: a type 402, a category 404, and an implementation name 406. The information in the database 400 may be periodically created and updated based on, for example, information received from a designer.

The type 402 may be, for example, an alphanumeric code associated with an extension that may be added to a parsing environment (e.g., "Type0" or "Type1" or "com.sap.Type0"). The category 404 may represent one or more nodes from the graph 300 that will be implemented for that particular type 402. The implementation name 406 may, for example, represent a name assigned to that particular type and/or category 404. For example, as illustrated in FIG. 4, "Type 2" may implement node "IH_ACD" and be associated with an implementation name of "T2."

Based on the category graph 300 and the information in the type definition database 400, namespaces usable for the parsing may be determined as appropriate. For example, FIG. 5 is a tabular view of a namespace database 500 in accordance with some embodiments of the present invention. The table includes entries associated with categories of a parsing framework. The table also defines fields 502, 504, 506 for each of the entries. The fields specify: a category 502, a name 504, and an implementation 506. The information in the database 500 may be periodically created and updated based on information in the graph 300 and the type definition database 400.

The category 502 may be, for example, an alphanumeric code associated with one or more nodes in the graph 300 and may be based on, or otherwise associated with, the category 404 in the type definition database. For each category 502, the namespace database 500 may associate one or more names 504 and/or implementations 506 that are usable for parsing. For example, in connection with category "IB," the namespace database associates both the name "T1" (and implementation "Type1") and the name "T3" (and implementation "Type3") as being usable for parsing.

Thus, embodiments may provide automatically configured namespaces (e.g., instead of a fixed number of interpretation contexts). Such embodiments may, for example, be used in a test framework for processes to describe a structure of intended build results and/or to compare them against actual results. For example, some embodiments may be associated with a transformation of an XML document to a document object model structure.

Note that in XML-base parsing frameworks, such as the Ant tool, it may only be possible to derive either a parameter name or an argument type from a java bean to map an XML-based description to a bean graph. As a result, a designer may need to manually address this limitation. According to some embodiments described herein, both kinds of information may be combined to automatically parse multiple levels of nested XML elements without the need of an explicit, manually implemented work around.

Note that with respect to polymorphism, two kinds of information may be required: (i) a name for a nested element, and (ii) a name for an argument. For example, a name for a nested element that can be used to determine the implementation (according the applicable namespace to map names to implementations) may be needed. This name may chosen by the designer or developer of the description/script according to the type definitions and his or her needs. Similarly, a name for an argument describing the purpose of the argument in the scope of the requesting object (that will receive the parsed object) may be needed. Note that the same technical parameter type (for example, a path-like type in Ant) may be used to describe values for totally different purposes (for example a compilation class path and source path). As a result, an argument category is typically not sufficient to specify the full purpose of usage of the argument.

In the Ant tool, an argument is described by a nested XML tag. Either (i) a name derived from a java method name is chosen to enforce a dedicated name to specify the parameter, or (ii) the argument type is used to find an implementation according to the tag name and the used namespace for implementation mappings. Note that both kinds of information cannot be described at the same time (and by the same XML element), such as by the name of the XML tag.

According to some embodiments of the present invention, the two kinds of information may be combined and determined during reflection of the class of the hosting object to use both: (i) a name of the parameter determined by the method name, and (ii) a category for the implementation type mapping according to any of the embodiments described herein at the same time. Such an automatic mechanism of the parsing framework may comprise, for example, using two nested element levels (e.g., instead of one).

Figure 6:
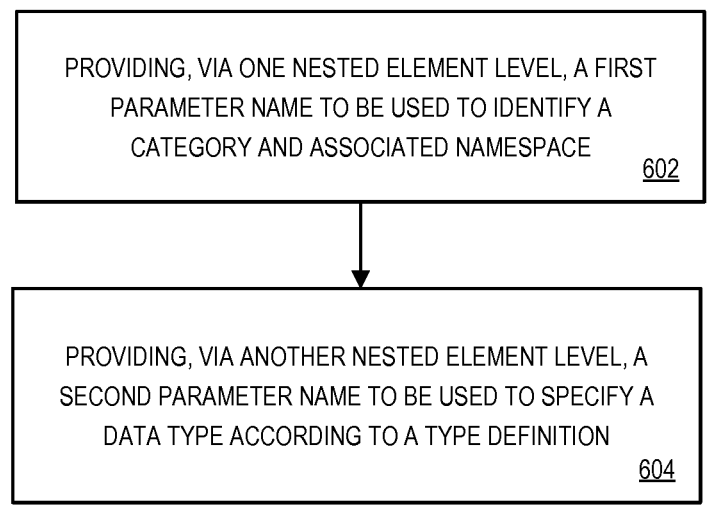
FIG. 6 illustrates a polymorphism method in accordance with some embodiments of the present invention

FIG. 6 illustrates a polymorphism method in accordance with some embodiments of the present invention. At 602, a first parameter name is provided via one nested element level. The first parameter name may, for example, be used to identify a category and associated namespace in accordance with any of the embodiments described herein. At 604, a second parameter name is provided via a another nested element level. The second parameter name may, for example, be used to specify a data type according to a type definition in connection with any of the embodiments described herein.

For example, an additional setter may be used that specifies both a name and a base type. The name may be used to specify a parameter tag name and the type may be used to provide the base type for the implementation selection of the argument with an additional nested element:

```
public void addArgumentMyPurpose{BaseType value) {...}
public void addArgumentMyOtherPurpose{BaseType value) {...}
```

```
<typedef name="mytype" class=."..."/>
<myelement ...>
    <mypurpose>
        <mytype ...>
        ...
        </mytype>
    </mypurpose>
    <myotherpurpose>
        <mytype ...>
        ...
        </mytype>
    </myotherpurpose>
    ...
</myeleemnt>
```

Here, the parameter name may be used to parse a first level of nested elements (in the code above, this is illustrated by the <mypurpose> element). The base type may be used to identify the category (and, with this, the namespace for the lookup of an implementation). That is, one level may be specified by the hosting context, and the other one may be used to specify a data type according to the type definitions (in the code above, this is illustrated by the <mytype> element).

Note that two pieces of information may be required: the name of the parameter the argument should be used for and the data type used as argument value. Thus, two nesting tag levels may be used. The first one may be for the parameter name and the second one as the name of the data type to be used as argument value.

According to some approaches, this may be done using the Ant build tool and/or by using a manually implemented additional bean to for the parsing of the additional element. In connection with some embodiments of the present invention, this may now be done automatically without the need for development work by a developer.

In some cases, another kind of method is used by reflection to extract the two kinds of information: (i) the name of the parameter from the method name (which in the above example is MyPurpose and MyOtherPurpose), and (ii) at the same time the parameter type is used to specify the category and the namespace for the data type of the required value. The parsing framework now uses both elements (in contrast to only one, as before) to automatically parse two nesting levels just described by evaluating one bean and one bean method.

Note that the same tag name, wherever it appears (e.g., as nested tag or somewhere else in the XML document) may refer to different namespaces and may therefore be resolved to different data types. The resolution and the determination of the namespace may be controlled by the bean used for parsing of this tag that is determined by the surrounding tag. For example:

```
<some tag> --->   mapped to a (surrounding) bean, controlling the
                  parsing of the nested tags
    <tag> --->    namespace determined by the surrounding
                  bean
    ...
    </tag>
</some tag>
```

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although embodiments have been described as being used to implement XML described frameworks any other type of parsing framework may be associated with the present inventions. Moreover, although particular types of category graphs and namespaces have been described, embodiments may be associated with any other type of appropriate parsing framework.

Further, in some embodiments described herein a first extensible mark-up language tag is associated with a first namespace and a second extensible mark-up language tag, nested with respect to the first extensible mark-up language tag and having the same name as the first extensible mark-up language tag, is associated with a second namespace separate from the first namespace. Note, however, that embodiments are not restricted to nested elements only, For example, each parsing context described by a surrounding element may use another namespace for parsing, regardless of its location in the XML element graph.

The several embodiments described herein are solely for the purpose of illustration. Persons skilled in the art will recognize from this description other embodiments may be practiced with modifications and alterations limited only by the claims.

What is claimed is:
1. A method, comprising:
   determining categories and an associated category graph for a parsing framework associated with execution of an automated software build tool;
   determining a plurality of types, wherein each type implements at least one category;
   automatically determining, by a processor, a set of types for each category, wherein a type is included in a set for a particular category when that type implements that category or any descendant of that category in the category graph;
   automatically defining, by the processor, namespaces for the categories based at least in part on sets of types associated with each category, wherein the categories and namespaces are associated with a description;
   simultaneously determining, using reflection of a single Java bean and associated Java bean method, both: (i) a name of a parameter in accordance a method name, and (ii) a category and said associated automatically defined namespace in accordance with a parameter type;
   automatically parsing two nesting levels using both (i) the name of the parameter and (ii) the category and said associated namespace, wherein the category and said associated namespace are identified by a first nested element level and the parameter type is identified by a second nested element level within the first nested element level;
   executing the automated software build tool in accordance with the defined namespaces such that (i) a first parameter name at a first location in the automated software build tool refers to first namespace and is resolved to a first parameter type and (ii) the first parameter name at a second location in the automated software build tool refers to a second namespace and is resolved to a second parameter type; and
   creating a graph structure based on the description in accordance with parsing by the parsing framework.
2. The method of claim 1, further comprising:
   receiving a request for the category of a given parameter interface element associated with a tag; and retrieving an appropriate category to identify a namespace associated with the tag.

3. The method of claim 2, wherein the tag comprises an extensible mark-up language tag.

4. The method of claim 1, wherein a first tag is associated with a first namespace and a second tag, nested with respect to the first tag and having the same name as the first tag, is associated with a second namespace separate from the first namespace.

5. The method of claim 1, wherein the parsing framework is associated with a transformation of an XML document into a document object model structure.

6. The method of claim 1, wherein a new category is automatically created and inserted into the category graph as a direct child of all categories in the graph that are a super-category and that do not have a child that is the super-category of the new category.

7. The method of claim 6, wherein all siblings of a new category that are sub-categories of the new category are moved to be direct children of the new category in the category graph.

8. The method of claim 7, wherein each category is assigned a namespace, and the namespace of a category contains entries of direct sub-categories.

9. The method of claim 8, wherein a mapping provided by a namespace is unique within the parsing framework.

10. The method of claim 1, wherein a category may be created based on a specification of an interface or implementation element.

11. A system, comprising:
a namespace database; and
a processor coupled to the namespace data and executing a parsing framework component associated with execution of an automated software build tool, the parsing framework component including:
a category determination component to determine categories and an associated category graph for a parsing framework associated with execution of an automated software build tool;
a type determination component to determine a plurality of types, wherein each type implements at least one category;
a set of types determination component to determine a set of types for each category, wherein a type is included a set of types for a particular category when that type implements that category or any descendant of that category in the category graph;
a namespace definition component to (i) automatically define namespaces for the categories based at least in part on sets of types associated with each category, wherein the categories and namespaces are associated with a description, and (ii) store information about the defined namespaces in the namespace database;
an automated software build tool component to simultaneously determine, using reflection of a single Java bean and associated Java bean method, both: (i) a name of a parameter in accordance a method name, and (ii) a category and said associated automatically defined namespace in accordance with a parameter type, and further to automatically parse two nesting levels using both (i) the name of the parameter and (ii) the category and said associated namespace, wherein the category and said associated namespace are identified by a first nested element level and the parameter type is identified by a second nested element level within the first nested element level, and further wherein said automated software build tool component is to execute the automated software build tool in accordance with the defined namespaces such that (i) a first parameter name at a first location in the automated software build tool refers to first namespace and is resolved to a first parameter type and (ii) the first parameter name at a second location in the automated software build tool refers to a second namespace and is resolved to a second parameter type; and
a graph creation component to create a graph structure based on the description in accordance with parsing by the parsing framework.

12. The system of claim 11, further comprising at least one of: (i) an input device, (ii) a communication device, or (iii) an output device.

13. The system of claim 11, further comprising a storage unit to store at least one of: (i) category graph information, or (ii) a type definition database.

14. The system of claim 11, further comprising a component to:
receive a request for a category of a given parameter interface element associated with an extensible mark-up language tag; and
retrieve an appropriate category to identify a namespace associated with the extensible mark-up language tag.

15. A non-transitory computer-readable medium storing processor-executable process steps that, when executed by a processor, perform a method, wherein the method comprises:
determining categories and an associated category graph for a parsing framework associated with execution of an automated software build tool;
determining a plurality of types, wherein each type implements at least one category;
automatically determining, by a processor, a set of types for each category, wherein a type is included in a set for a particular category when that type implements that category or any descendant of that category in the category graph;
automatically defining, by the processor, namespaces for the categories based at least in part on sets of types associated with each category, wherein the categories and namespaces are associated with a description;
simultaneously determining, using reflection of a single Java bean and associated Java bean method, both: (i) a name of a parameter in accordance a method name, and (ii) a category and said associated automatically defined namespace in accordance with a parameter type;
automatically parsing two nesting levels using both (i) the name of the parameter and (ii) the category and said associated namespace, wherein the category and said associated namespace are identified by a first nested element level and the parameter type is identified by a second nested element level within the first nested element level;
executing the automated software build tool in accordance with the defined namespaces such that (i) a first parameter name at a first location in the automated software build tool refers to first namespace and is resolved to a first parameter type and (ii) the first parameter name at a second location in the automated software build tool refers to a second namespace and is resolved to a second parameter type; and
creating a graph structure based on the description in accordance with parsing by the parsing framework.

* * * * *